(12) United States Patent
Kronander et al.

(10) Patent No.: US 11,329,522 B2
(45) Date of Patent: May 10, 2022

(54) TECHNIQUE FOR WIRELESSLY CHARGING A WIRELESS DEVICE IN A WIRELESS COMMUNICATION SYSTEM

(71) Applicant: Telefonaktiebolaget LM Ericsson (publ), Stockholm (SE)

(72) Inventors: Jonas Kronander, Knivsta (SE); Andreas Höglund, Solna (SE); Andres Laya, Stockholm (SE); Yngve Selén, Uppsala (SE); Hugo Tullberg, Nyköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 100 days.

(21) Appl. No.: 16/971,125

(22) PCT Filed: Mar. 7, 2018

(86) PCT No.: PCT/EP2018/055621
§ 371 (c)(1),
(2) Date: Aug. 19, 2020

(87) PCT Pub. No.: WO2019/170228
PCT Pub. Date: Sep. 12, 2019

(65) Prior Publication Data
US 2021/0013750 A1 Jan. 14, 2021

(51) Int. Cl.
*H02J 50/80* (2016.01)
*H02J 50/90* (2016.01)
*H02J 50/20* (2016.01)

(52) U.S. Cl.
CPC .............. *H02J 50/80* (2016.02); *H02J 50/90* (2016.02); *H02J 50/20* (2016.02)

(58) Field of Classification Search
CPC ............ H02J 50/20; H02J 50/80; H02J 50/90
USPC ................................................. 307/104, 149
See application file for complete search history.

(56) References Cited

U.S. PATENT DOCUMENTS

| 9,312,701 B1 | 4/2016 | Mor et al. |
| 9,692,250 B2 | 6/2017 | Priev et al. |
| 9,985,465 B1 * | 5/2018 | Glover .................... H02J 7/025 |
| 2010/0054223 A1 | 3/2010 | Zhang et al. |
| 2011/0136530 A1 | 6/2011 | Deshpande |
| 2015/0022012 A1 | 1/2015 | Kim et al. |
| 2016/0049823 A1 | 2/2016 | Stein et al. |
| 2016/0105841 A1 | 4/2016 | Kang |
| 2016/0126753 A1 | 5/2016 | Wight et al. |

FOREIGN PATENT DOCUMENTS

| EP | 3154153 A1 | 4/2017 |
| JP | 2013201501 A | 10/2013 |

* cited by examiner

*Primary Examiner* — William Hernandez
(74) *Attorney, Agent, or Firm* — Coats & Bennett, PLLC

(57) ABSTRACT

A technique for wirelessly charging a wireless device using a charging beam transmitted by a base station in a wireless communication system is disclosed. A method implementation of the technique is performed by the base station and comprises receiving (S208), from the wireless device, feedback on charging quality observed by the wireless device, and adjusting (S212) the charging beam based on the feedback received from the wireless device.

24 Claims, 9 Drawing Sheets

US 11,329,522 B2

TECHNIQUE FOR WIRELESSLY CHARGING A WIRELESS DEVICE IN A WIRELESS COMMUNICATION SYSTEM

TECHNICAL FIELD

The present disclosure generally relates to the field of wireless charging. In particular, a technique for wirelessly charging a wireless device using a charging beam transmitted by a base station in a wireless communication system is presented. The technique may be embodied in methods, computer programs, apparatuses and systems.

BACKGROUND

In recent years, the Internet of Things (IoT) has emerged as a general vision of systems of interrelated objects equipped with computing, networking and sensing capabilities enabling the objects to collect and exchange data without requiring human-to-computer interaction. In IoT systems, various use cases may be envisioned and, in many cases, such as in agriculture, e-health, or other fields of use, it may be required that the involved wireless devices, such as wireless sensors, support long battery life.

While wireless charging of batteries over short distances, e.g., using charging stations for mobile phones, is a well-established technical field, techniques for wirelessly charging batteries over longer distances, e.g., up to 100 m, have not yet been adopted to a similar extent. These techniques are typically based on a transmitter which transmits a charging beam with several Watts of output power through one or more antennas steered to a receiving device. The device receiving the charging beam may have a battery that needs to be recharged and, in other examples, the receiving device may require charging a capacitor to operate. Operations performed by the receiving device may include transmitting sensor reports using wireless communication technology, such as Wi-Fi, Bluetooth, 4G or 5G technology, for example.

Devices requiring wireless charging may be stationary and the amount of charging required is typically small. In other scenarios, it may be required to wirelessly charge moving devices, e.g., a sensor that is attached to a moving robot arm in a factory, a sensor that is integrated into a drone, or even the drone itself.

While the feasibility of long distance wireless charging has been demonstrated in general, e.g., in line of sight conditions, improvements of the techniques are still required to support further use cases.

SUMMARY

Accordingly, there is a need for a technique that enables improved wireless charging in a wireless communication system.

According to a first aspect, a method for wirelessly charging a wireless device using a charging beam transmitted by a base station in a wireless communication system is provided. The method is performed by the base station and comprises receiving, from the wireless device, feedback on charging quality observed by the wireless device, and adjusting the charging beam based on the feedback received from the wireless device. The method may also comprise sweeping the charging beam, wherein the feedback is received from the wireless device during the sweeping of the charging beam.

The method may make use of the fact that directing the charging beam towards the precise location of the wireless device generally (e.g., in the absence of obstructions) achieves more efficient wireless charging. In order to identify a favorable configuration of the charging beam, e.g., that maximizes charging efficiency, the charging beam may be swept by the base station (or the wireless device may move while the charging beam is fixed), while the feedback from the wireless device may be used to identify the favorable configuration. The favorable configuration of the charging beam may include a favorable direction or, more generally, a favorable radiation pattern of the charging beam, for example.

As known to the person skilled in the art, beam sweeping may correspond to the procedure of changing the direction of a beam over time. More specifically, beam sweeping may include ensuring that transmission of a beam from one or more antennas is directed in a particular direction, wherein the direction may then be changed over time. The direction of a beam may correspond to the direction of the main lobe of the radiated electromagnetic far field generated by the one or more antennas. If a parabolic antenna is used, for example, beam sweeping may be achieved by changing the orientation of the parabolic antenna, e.g., using a motor that turns the antenna into a desired direction. If an array of antennas is used (as it is the case in most modern communications systems), on the other hand, weights of the antennas may be set to a particular combination to generate a beamformed signal having a radiation pattern in a certain direction. Beam sweeping may then be achieved by changing the antenna weights over time so that the beam changes its direction. When sweeping the charging beam, the charging beam may be swept in a plurality of directions.

In order to assist the base station in identifying the favorable (e.g., the best) configuration of the charging beam, the wireless device may provide feedback on charging quality observed (e.g., during the sweeping of the charging beam), and the base station may use this feedback to adjust the charging beam accordingly. In one implementation, the base station may identify, based on the feedback received from the wireless device (e.g., during the sweeping of the charging beam), a favorable direction of the charging beam for the wireless device, wherein adjusting the charging beam includes directing the charging beam to the favorable direction. This procedure is hereinafter also denoted as the "scan procedure" performed by the base station.

The wireless communication system may correspond to any wireless communication system in which beams transmitted by base stations are suitable for wireless device charging. As a mere example, the wireless communication system may correspond to a cellular network, such as a 4G or 5G network, but it will be understood that the technique presented herein may be practiced with other wireless communication systems as well, such as Wi-Fi networks, for example. The wireless device may correspond to any device that is capable of being wirelessly charged using a charging beam received from a base station of the wireless communication system. The wireless device may correspond to a user equipment (UE), such as a mobile phone or drone, or simply a wireless sensor, such as a sensor deployed in an IoT system, for example. As such, the wireless device may be a stationary device that is fixed to a particular location and, in other examples, the wireless device may be a movable device that can be instructed to move to another location.

The feedback provided by the wireless device to the base station may comprise information that allows the base station to derive the favorable configuration. In one variant, the feedback may include information on charging power received by the wireless device through the charging beam. For example, the information on the charging power may include at least one of one or more charging power values observed (e.g., in real-time, and during the sweeping of the charging beam), and a maximum charging power value observed (e.g., during the sweeping of the charging beam) including information indicative of a direction of the charging beam at which the maximum charging power was observed. The one or more charging power values may be provided with timestamps indicating when these values were observed. The information indicative of a direction of the charging beam at which the maximum charging power value was observed may correspond to a timestamp as well, e.g., a timestamp which indicates at which time the maximum charging power value was observed. In this way, the base station may derive which beam direction resulted in the maximum value.

Alternatively or additionally, the feedback may include information indicative of a preferred direction of the charging beam, as identified by the wireless device itself. In an example, the information indicative of the preferred direction may include a precoding matrix indicator (PMI) enabling the base station to derive which precoding matrix resulted in the most favorable charging values. The PMI may thus indicate preferred precoding weights to be applied by the base station when adjusting the charging beam. In another example, the information indicative of the preferred direction may simply include a timestamp at which the wireless device considers the charging results to be most favorable.

The feedback may be provided by the wireless device periodically or at preconfigured events (e.g., during the sweeping of the charging beam). In addition to the feedback from the wireless device, the identification of the favorable configuration of the charging beam may be supported by positioning techniques that allow the base station to determine the precise or approximated position of the wireless device. These techniques may include network-based positioning techniques, such as enhanced cell id (ECID), observed time difference of arrival (OTDOA), and/or uplink time difference of arrival (UTDOA), for example. In another variant, information on the position of the wireless device may be identified by the wireless device itself, e.g., using a global navigation satellite system (GNSS), such as the global positioning system (GPS), and may be provided to the base station by the wireless device.

To fine-tune the scan procedure and refine the favorable configuration of the charging beam, the sweeping of the charging beam may be carried out iteratively in different directions and/or with different offsets. Also, a favorable charging beam (e.g., its configuration) may be identified among a plurality of charging beams transmitted by the base station. The base station may in this case sweep a plurality of charging beams, and receive, from the wireless device, feedback on charging qualities associated with the plurality of charging beams observed by the wireless device during the sweeping of the plurality of charging beams. The feedback may in this case include, for each of the plurality of charging beams, a beam identifier identifying the respective charging beam, wherein the beam identifier may be associated with the charging quality observed for the respective charging beam. The charging beam mentioned previously may correspond to one of the plurality of charging beams and each feedback provided for the plurality of charging beams may correspond to the same type of feedback described above for the (single) charging beam.

Once identified, the favorable configuration of the charging beam may be stored in a database (e.g., by the base station or another network node in the wireless communication system, such as a mobility management entity (MME)), possibly associated with an ID or context of the wireless device, so that the base station can reuse this information at a later point of time.

If the wireless device is a movable device, the wireless charging efficiency may be improved by instructing the wireless device to move to a location that allows for better charging conditions, or to move along a path that allows for better charging conditions while the wireless device is in motion. For example, the wireless device may be instructed to move out of a shadowing situation. In order to identify such preferred locations and/or movement paths, the base station may send, to the wireless device, one or more movement instructions, receive, from the wireless device, feedback on charging quality observed by the wireless device during movement in accordance with the one or more movement instructions, and identify, based on the feedback received from the wireless device during the movement, one or more preferred locations and/or one or more preferred movement paths at which favorable wireless charging conditions are present. This procedure is hereinafter also denoted as the "directing procedure" performed by the base station.

The one or more movement instructions may include at least one of an instruction to move to in a particular direction, an instruction to orient in a particular direction, an instruction to move for a particular distance, an instruction to move to a particular location, and an instruction to move along a particular movement path. The feedback provided by the wireless device to the base station during the directing procedure may be of the same type as described above for the feedback provided by the wireless device during the scan procedure. During movement, the wireless device may also provide information to the base station about the movement itself, such as an indication of the direction in which the wireless device is heading or the final destination, for example.

The one or more preferred locations and/or the one or more preferred movement paths may be stored in a database (e.g., by the base station or another network node in the wireless communication system, such as an MME), possibly associated with an ID or context of the wireless device, and may be used at a later point of time to provide movement instructions directing the wireless device to these locations and/or along these movement paths again. The base station may thus send, to the wireless device, one or more movement instructions to direct the wireless device to a preferred location and/or along a preferred movement path at which favorable wireless charging conditions are (known to be) present. The stored information on a preferred location and/or a preferred movement path may also be used for other wireless devices. In such an implementation, the preferred location and/or the preferred movement path may be identified based on feedback on charging quality received from one or more wireless devices other than the wireless device, i.e., in other words, the preferred location and/or the preferred movement path may have been identified in previous directing procedures performed with other wireless devices. Alternatively or additionally, a preconfigured charging location may be associated with the wireless device and the wireless device may be instructed to move to the preconfigured charging location when a charging need exists.

Charging of the wireless device may be carried out once the scan procedure and/or the directing procedure is completed. The base station may thus charge the wireless device by transmitting, to the wireless device, the charging beam, wherein, in case of completion of the scan procedure, the charging beam may be the adjusted charging beam. Also, the wireless device may already be charged using the charging power received through the charging beam during the scan procedure and/or the directing procedure. The latter may be optional, however, and effective charging may only commence after the respective procedure is completed.

In one implementation, the charging of the wireless device may be initiated upon request of the wireless device. For example, the base station may receive a charge request from the wireless device, perform the scan procedure in response thereto, and charge the wireless device using the adjusted charging beam thereafter. Upon receiving the charge request, the base station may optionally acknowledge the request prior to commencing the scan procedure and/or the directing procedure. When a previously determined favorable configuration of the charging beam is stored for the wireless device, as described above, the scan procedure may be omitted and the wireless device may be charged straight away using the stored favorable configuration. In another variant, the base station may acknowledge the charge request and commence the scan procedure and/or the directing procedure and/or the charging at a later time when high-frequency beams are not needed for communication with the wireless device.

In another implementation, the charging of the wireless device may be initiated by the base station when the wireless device is at a preferred location and/or a preferred movement path and, optionally, when the wireless device is in an idle state. For example, the base station may create a list (or map) of chargeable wireless devices in its coverage area (as well as their recharging needs, for example) and may proactively initiate the charging of the wireless device when the wireless device is at the preferred location and/or moves along the preferred movement path and/or when the wireless device is in an idle state, in particular when the high-frequency communication mode of the wireless device is idle.

The charging beam itself may be a dedicated charging beam or an idle beam currently not being used for communication, or the charging beam may result from one or more beamformed communication signals transmitted to the wireless device, e.g., from communication signals that are transmitted to the wireless device anyway, such as synchronization signals (e.g., primary synchronization signals (PSS) and secondary synchronization signals (SSS)), cell reference signals (e.g., cell specific reference signals (CRS)), broadcast signals transmitting system information (SI), or the like. The charging beam may be transmitted with a certain output power through one or more antennas of the base station, as described above.

As a further measure for improving the wireless charging efficiency, i.e., in addition to the scan procedure and/or the directing procedure, the base station may adjust parameters of the wireless device to enhance reception of the charging beam. In one such variant, the base station may send, to the wireless device, an instruction to adjust a discontinuous reception (DRX) cycle of the wireless device based on the feedback received from the wireless device (i.e., as received during the scan procedure and/or during the directing procedure).

In order to ensure that the base station indeed charges the wireless device, i.e., the device it is communicating with using communication signals, a confirmation procedure may be performed. According to this procedure, the base station may temporarily direct the charging beam away from the favorable direction (this may cause the wireless device to transmit an "energy reception lost" signal, or, if an "energy reception" signal is periodically sent to the base station during energy reception, the wireless device may cease transmitting the "energy reception" signal, or no activity from the wireless device may be visible to the base station at all) and redirect the charging beam back to the favorable direction, possibly approaching from a different angle (this may cause the wireless device to transmit the "energy reception" signal again) to confirm that the base station charges the correct wireless device, i.e., the wireless device the base station is communicating with.

Prior to the scan procedure and/or the directing procedure, a registration procedure may be performed in which information on recharge needs and capabilities may be exchanged between the wireless device and the base station. In one such variant, the base station may receive, prior to receiving the feedback (or sweeping the charging beam), a registration message from the wireless device to register the wireless device as a rechargeable device with the wireless communication system. The registration message may include information indicating at least one of a battery status of the wireless device, a recharging need of the wireless device, and whether the wireless device is a movable device capable of being directed by movement instructions from the wireless communication system, for example.

Using the registration message, the wireless device may register itself with the base station. It will be understood, however, that the base station may also convey the registration message to another network node in the wireless communication system, such as an MME, with which the registration procedure may be performed. In case of an MME, any radio-related parameters may be stored in association with the context of the wireless device until a subsequent connection or charging session associated with the wireless device is established. In such a case, the base station may obtain information, such as whether the wireless device is a rechargeable device, from the MME (or the other network node that stores such information, as indicated above).

As regards signaling messages exchanged between the wireless device and the base station in relation to the charging of the wireless device, such as the above-mentioned charge request, the registration message, or the feedback, for example, dedicated communication protocols may be employed. In one variant, on the other hand, signaling related to the charging of the wireless device may be carried out in accordance with an existing radio technology standard, wherein information related to the charging of the wireless device may be included in signaling messages of the existing radio technology standard. The existing radio technology standard may be one of a Narrow Band IoT, NB-IoT, an Enhanced Machine-Type Communications, eMTC, a Long Term Evolution, LTE, and a New Radio, NR, standard. It will be understood, however, that other existing radio technology standards may be employed, such as Wi-Fi, Long Range Wide Area Network (LoRaWAN) or Sigfox, for example, just to name a few.

As an example, in a connected/active mode of the wireless device (e.g., RRC_CONNECTED), the information related to the charging of the wireless device could be included in radio resource control (RRC) signaling (e.g., in an RRC Release command) or in radio link control (RLC) signaling (e.g., in an RLC ACK or RLC status report). As another example, for dynamic scheduling, a new downlink control information (DCI) could be used in a physical downlink control channel (PDCCH) to indicate, in addition to the starting point, the endpoint of the charging transmission, to indicate whether the transmission is a charging transmission, and to indicate a resource allocation for the charging transmission. As a further example, the base station may inform the wireless device about configurations of any, possibly periodic, charging transmissions in the same cell using RRC signaling.

In an idle/inactive mode (e.g., RRC_IDLE), the information related to the charging of the wireless device, such as information related to a charging configuration, may be broadcasted in SI, for example. As another example, the charging configuration could be transmitted as part of a routing or tracking area update (TAU) performed in combination with an MME. For example, the wireless device may request the wireless charging in a TAU Request message and the MME may provide the charging configuration in a TAU Accept message. When the wireless device enters an idle/inactive mode, it may be necessary to keep the context of the wireless in order to be able to continue transmitting charging signals to the wireless device. Corresponding information could be stored in the base station or another network node in the wireless communication system, such as the MME, for example.

If the wireless device has almost no battery left, it may use a very low overhead approach to signal its recharge need. As an example, an indication of the recharge need may be transmitted by the wireless device using a single bit in a random access procedure or, in another example, this indication may be made using a specific preamble (or using a specific subset of existing preambles). The preamble may also indicate the identity of the wireless device and therefore allow the base station to directly use a previously stored favorable configuration of the charging beam for the charging of the wireless device.

It will be understood that the above-described signaling options are merely exemplary and that various other implementations are conceivable. In general, the charging configuration that may be signaled to the wireless device may be determined by the base station based on at least one of a DRX cycle of the wireless device, an extended DRX (eDRX) cycle and a paging time window (PTW) length, the feedback provided by the wireless device in the scan procedure and/or the directing procedure, the position of the wireless device, SI configuration, synchronization signal configuration, a traffic pattern or subscription type (e.g., frequency of data reporting or downlink reachability) of the wireless device, a battery capacity of the wireless device, whether the wireless device is battery operated or capacitor based, a coverage level of the wireless device, and whether the wireless device is stationary or mobile. The charging configuration may specifically apply to the wireless device or at least part of the charging configuration may be the same for a plurality of wireless devices in a cell, even though signaling to the wireless devices in the cell may be device specific.

According to a second aspect, a method for wirelessly charging a wireless device using a charging beam transmitted by a base station in a wireless communication system is provided. The method is performed by the wireless device and comprises receiving, from the base station, a charging beam, observing a charging quality, and sending, to the base station, feedback on the observed charging quality. The charging beam may also be swept, wherein the charging quality is observed during the sweeping of the charging beam.

The method according to the second aspect defines a method from a wireless device's perspective which may be complementary to the method according to the first aspect performed by a base station. As such, those aspects described with regard to the method of the first aspect which are applicable to the method of the second aspect may be comprised by the method of the second aspect as well, and vice versa. Unnecessary repetitions are thus omitted in the following.

As in the method of the first aspect, the feedback may include information on charging power received by the wireless device through the charging beam. The information on the charging power may include at least one of one or more charging power values observed (e.g., during the sweeping of the charging beam), and a maximum charging power value observed (e.g., during the sweeping of the charging beam) including information indicative of a direction of the charging beam at which the maximum charging power value was observed. Alternatively or additionally, the feedback may include information indicative of a preferred direction of the charging beam.

The charging beam may be received iteratively from different directions and/or with different offsets. For the identification of a favorable charging beam among a plurality of charging beams transmitted by the base station, the wireless device may receive, from the base station, a plurality of charging beams being swept, observe charging qualities associated with the plurality of charging beams during the sweeping of the plurality of charging beams, and send, to the base station, feedback on the observed charging qualities. The feedback may in this case include, for each of the plurality of charging beams, a beam identifier identifying the respective charging beam, wherein the beam identifier is associated with the charging quality observed for the respective charging beam.

If the wireless device is a movable device, the wireless device may—as part of the directing procedure—receive, from the base station, one or more movement instructions, move in accordance with the one or more movement instructions, observe a charging quality during the movement, and send, to the base station, feedback on the observed charging quality. The one or more movement instructions may include at least one of an instruction to move in a particular direction, an instruction to orient in a particular direction, an instruction to move for a particular distance, an instruction to move to a particular location, and an instruction to move along a particular movement path. Once a preferred location and/or a preferred movement path is known, the wireless device may receive, from the base station, one or more movement instructions to move to the preferred location and/or along the preferred movement path, and move in accordance with the one or more movement instructions.

When the charging beam is adjusted in response to sending the feedback to the base station, the wireless device may receive, from the base station, the adjusted charging beam, and charge using the adjusted charging beam received from the base station. In one implementation, the charging of the wireless device may be initiated upon request from the wireless device. In another implementation, the charging of the wireless device may occur without initiation by the wireless device when the wireless device is at a preferred location and/or a preferred movement path and, optionally, when the wireless device is in an idle state. In this case, charging may proactively be initiated by the base station. The charging beam may be a dedicated charging beam or an idle beam currently not being used for communication, or the charging beam may result from one or more beamformed communication signals received by the wireless device.

As a further measure for improving the wireless charging efficiency, the wireless device may receive, from the base station, an instruction to adjust a discontinuous reception cycle of the wireless device in response to sending the feedback to the base station. As to the registration procedure, the wireless device may send a registration message to the wireless communication system to register the wireless device as a rechargeable device with the wireless communication system. The registration message may include information indicating at least one of a battery status of the wireless device, a recharging need of the wireless device, and whether the wireless device is a movable device capable of being directed by movement instructions from the wireless communication system.

Signaling related to charging of the wireless device may be carried out in accordance with an existing radio technology standard, wherein information related to charging of the wireless device may be included in signaling messages of the existing radio technology standard. The existing radio technology standard may be one of an NB-IoT, an eMTC, an LTE, and an NR standard.

When it comes to receiving charging power through the charging beam, the wireless device may, in one variant, comprise separate antennas for communication and reception of energy, wherein the wireless device receives the charging beam via at least one antenna dedicated to the reception of energy only. In another variant, the wireless device may comprise at least one antenna used jointly for communication and reception of energy, wherein the wireless device receives the charging beam via the at least one antenna. The wireless device may further comprise an energy receiver which is configured to transform the received charging beam to a current that is suitable for running the wireless device and/or charge its battery.

According to a third aspect, a computer program product is provided. The computer program product comprises program code portions for performing the method of at least one of the first and the second aspect when the computer program product is being executed on one or more computing devices, e.g., on a base station in case of the method of the first aspect and on a wireless device in case of the method of the second aspect. The computer program product may be stored on a computer readable recording medium, such as a semiconductor memory, DVD, CD-ROM, and so on.

According to a fourth aspect, a base station for wirelessly charging a wireless device using a charging beam transmittable in a wireless communication system by the base station is provided. The base station comprises processing means configured to receive, from the wireless device, feedback on charging quality observed by the wireless device, and adjust the charging beam based on the feedback received from the wireless device. The base station may be configured to perform any of the method steps presented herein with respect to the first aspect. The processing means may comprise at least one processor and at least one memory, wherein the at least one memory contains instructions executable by the at least one processor such that the processing means are operable to perform the method steps presented herein.

According to a fifth aspect, a wireless device configured to be wirelessly charged using a charging beam transmittable by a base station in a wireless communication system is provided. The wireless device comprises processing means configured to receive, from the base station, a charging beam, observe a charging quality, and send, to the base station, feedback on the observed charging quality. The wireless device may be configured to perform any of the method steps presented herein with respect to the second aspect. The processing means may comprise at least one processor and at least one memory, wherein the at least one memory contains instructions executable by the at least one processor such that the processing means are operable to perform the method steps presented herein.

According to a sixth aspect, there is provided a system comprising a base station of the fourth aspect and a wireless device of the fifth aspect.

BRIEF DESCRIPTION OF THE DRAWINGS

Embodiments of the technique presented herein are described herein below with reference to the accompanying drawings, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details. For example, while the following embodiments will be described with regard to entities and signaling in certain wireless communication systems, such as LTE systems, it will be understood that the present disclosure shall not be limited thereto and that the technique presented herein may be practiced with any other wireless communication systems in which beams transmitted by a base station are suitable for wireless device charging.

Those skilled in the art will further appreciate that the steps, services and functions explained herein below may be implemented using individual hardware circuitry, using software functioning in conjunction with a programmed microprocessor or general purpose computer, using one or more application specific integrated circuits (ASICs) and/or using one or more digital signal processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 1A:
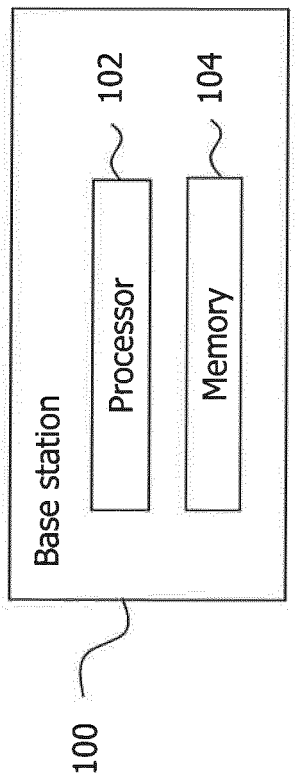
FIGS. 1a and 1b illustrate exemplary embodiments of a base station and a wireless device according to the present disclosure.

FIG. 1a schematically illustrates an exemplary embodiment of a base station 100 for wirelessly charging a wireless device using a charging beam transmittable by the base station 100 in a wireless communication system. The base station 100 comprises processing means enabling the base station 100 to perform the method steps described herein below. In the shown example, the processing means comprise at least one processor 102 and at least one memory 104, wherein the at least one memory 104 contains instructions executable by the at least one processor 102 such that the processing means are operable to carry out the method steps described herein. It will be understood that the processing means may belong to a physical computing unit as well as to a virtualized computing unit, such as a virtual machine, for example. It will further be appreciated that the processing means may not necessarily be implemented in stand-alone form, but may be implemented as components—realized in software and/or hardware—residing on multiple distributed computing units as well, such as in a cloud computing environment, for example. The base station 100 may also comprise one or more antennas for transmitting the charging beam and other information related to the charging of the wireless device and for receiving from the wireless device information related to the charging of the wireless device, as described below. The base station 100 may also comprise separate antenna(s) implementing the transmitting functionality and the receiving functionality.

Figure 1B:
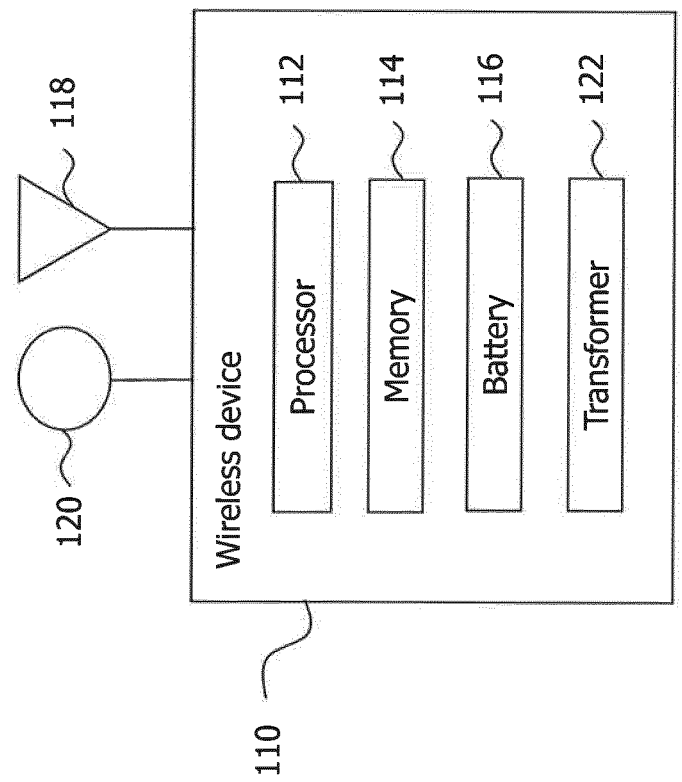

FIG. 1b schematically illustrates an exemplary embodiment of a wireless device 110 which is configured to be wirelessly charged using a charging beam transmittable by the base station 100 in the wireless communication system. The wireless device 110 comprises processing means enabling the wireless device 110 to perform the method steps described herein below. In the shown example, the processing means comprise at least one processor 112 and at least one memory 114, wherein the at least one memory 114 contains instructions executable by the at least one processor 112 such that the processing means are operable to carry out the method steps described herein. The wireless device 110 further comprises a battery 116 which supplies the necessary power for operating the wireless device 110. The wireless device 110 comprises separate antennas for communication and reception of energy, wherein antenna 118 is used for communication and antenna 120 is used for reception of energy through charging beams received from the base station 100. The wireless device 110 also comprises an energy transformer 122 which is configured to transform the received charging signals to a current that is suitable for running the wireless device and/or charge the battery 116.

The wireless device 110 may correspond to any device that is capable of being wirelessly charged using a charging beam received from the base station 100. The wireless device 110 may correspond to a UE, such as a mobile phone or drone, or simply a wireless sensor, such as a sensor deployed in an IoT system, for example. As such, the wireless device 110 may be a stationary device that is fixed to a particular location and, in other examples, the wireless device 110 may be a movable device that can be instructed to move to another location.

It will be understood that the above embodiment of the wireless device 110 is merely exemplary and that other designs are generally conceivable. For example, instead of a battery, the wireless device could also comprise a capacitor that needs to be charged for the wireless device to operate. Also, instead of separate antennas for communication and reception of energy, the wireless device could comprise an antenna used jointly for communication and reception of energy, wherein the charging beam is received through the joint antenna. Moreover, when the wireless device has a comparably simple configuration, such as in case of a wireless sensor, the wireless device may comprise an integrated circuit (IC)—instead of a complex processor—enabling the wireless device to perform its tasks.

The wireless communication system may correspond to any wireless communication system in which beams transmitted by a base station are suitable for wireless device charging. As a mere example, the wireless communication system may correspond to a cellular network, such as a 4G or 5G network, but it will be understood that the technique presented herein may be practiced with other communication systems as well, such as Wi-Fi networks, for example. In some of the following examples, the technique presented herein will exemplarily be described with regard to entities and signaling procedures in an LTE system. The base station 100 may in this case correspond to an eNodeB (eNB).

Figure 2A:
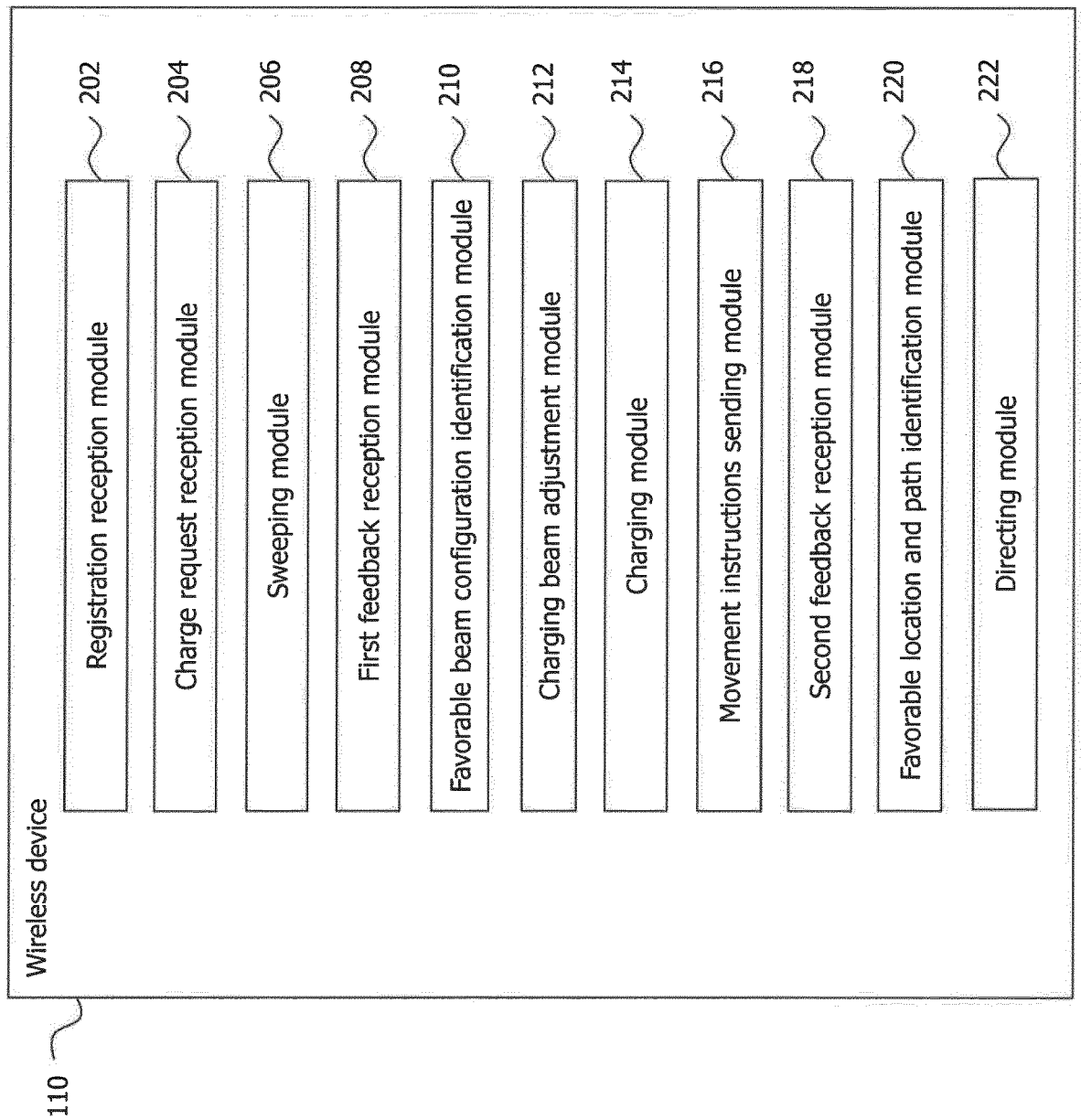
FIGS. 2a and 2b illustrate a module based design of a base station according to an embodiment of the present disclosure and a corresponding method embodiment which may be performed by the base station.
Figure 2B:
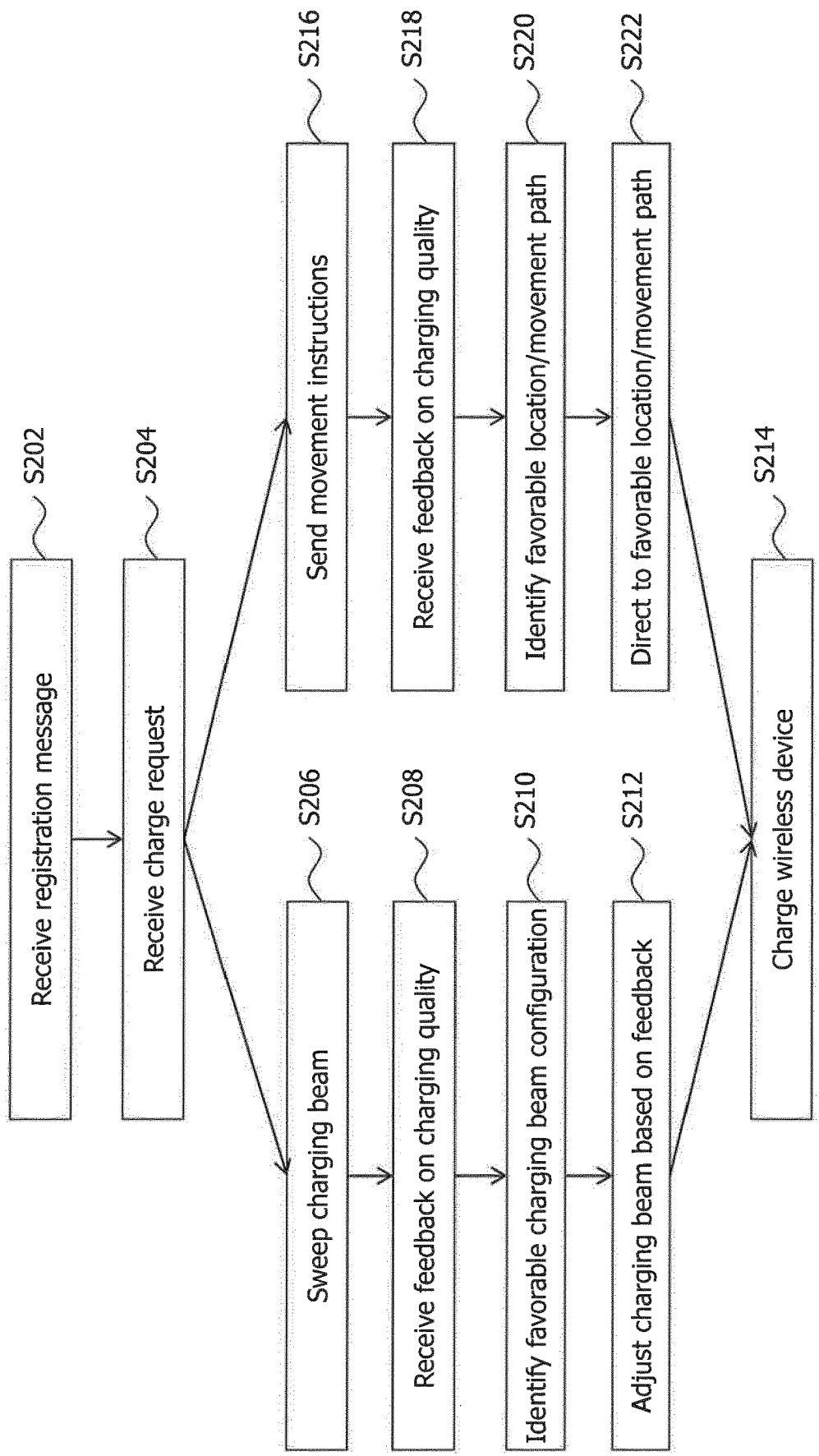

FIG. 2a schematically illustrates an exemplary module based design of the base station 100 and FIG. 2b illustrates a corresponding method embodiment which may be performed by the base station 100. Each module shown in FIG. 2a may correspond to a component that is realized in hardware and/or software. In particular, the functionality of each module may be implemented by the at least one processor 102 and the at least one memory 104 of the base station 100 described above in relation to FIG. 1a. The basic operation of the base station 100 will be described in the following with reference to both FIGS. 2a and 2b.

Initially, a registration procedure may be performed in which information on recharge needs and capabilities may be exchanged between the wireless device 110 and the base station 100. Therefore, in step S202, a registration reception module 202 of the base station 100 may receive a registration message from the wireless device 110 to register the wireless device 110 as a rechargeable device with the wireless communication system. The registration message may include information indicating at least one of a battery status of the wireless device 110, a recharging need of the wireless device 110, and whether the wireless device 110 is a movable device capable of being directed by movement instructions from the wireless communication system, for example.

Using the registration message, the wireless device 110 may register itself with the base station 100. It will be understood, however, that the registration message may also be conveyed by the base station 100 to another network node in the wireless communication system, such as an MME, with which the registration procedure may be performed. In case of an MME, any radio-related parameters may be stored in association with the context of the wireless device 110 until a subsequent connection or charging session associated with the wireless device 110 is established. In such a case, the base station 100 may obtain information, such as whether the wireless device 110 is a rechargeable device, from the MME (or the other network node that stores such information, as indicated above).

Upon completing the registration procedure, a charge request reception module 204 of the base station 100 may receive, in step S204, a charge request from the wireless device 110. Upon receiving the charge request, the base station 100 may proceed with performing either a scan procedure (corresponding to the left outgoing arrow from step S204) or a directing procedure (corresponding to the right outgoing arrow from step S204).

When the scan procedure is performed, the method proceeds with step S206, in which a sweeping module 206 of the base station 100 sweeps a charging beam transmitted by the base station 100. In step S208, a first feedback reception module 208 of the base station 100 may receive, from the wireless device 110, feedback on charging quality observed by the wireless device 110 during the sweeping of the charging beam. Further, in step S210, a favorable beam direction identification module 210 of the base station 100 may identify, based on the feedback received from the wireless device 110 during the sweeping of the charging beam, a favorable configuration of the charging beam for the wireless device 110. In step S212, a charging beam adjustment module 212 of the base station 100 may adjust the charging beam based on the feedback received from the wireless device 110.

This procedure may make use of the fact that directing the charging beam towards the precise location of the wireless device 110 generally (e.g., in the absence of obstructions) achieves more efficient wireless charging. In order to identify a favorable configuration of the charging beam, e.g., that maximizes charging efficiency, the charging beam may be swept by the base station 100 in step S206, while the feedback from the wireless device received in step S208 may be used to identify the favorable configuration in step S210. The favorable configuration of the charging beam may include a favorable direction or, more generally, a favorable radiation pattern of the charging beam, for example.

As known to the person skilled in the art, beam sweeping may correspond to the procedure of changing the direction of a beam over time. More specifically, beam sweeping may include ensuring that transmission of a beam from one or more antennas is directed in a particular direction, wherein the direction may then be changed over time. The direction of a beam may correspond to the direction of the main lobe of the radiated electromagnetic far field generated by the one or more antennas. If a parabolic antenna is used, for example, beam sweeping may be achieved by changing the orientation of the parabolic antenna, e.g., using a motor that turns the antenna into a desired direction. If an array of antennas is used (as it is the case in most modern communications systems), on the other hand, weights of the antennas may be set to a particular combination to generate a beamformed signal having a radiation pattern in a certain direction. Beam sweeping may then be achieved by changing the antenna weights over time so that the beam changes its direction. When sweeping the charging beam, the charging beam may be swept in a plurality of directions.

In order to assist the base station 100 in identifying the favorable (e.g., the best) configuration of the charging beam, the wireless device 110 may provide, in step S208, the feedback on the charging quality observed during the sweeping of the charging beam, and the base station 100 may use this feedback to adjust the charging beam in step S212. In one implementation, the base station 100 may identify, in step S210, based on the feedback received from the wireless device 110 during the sweeping of the charging beam, a favorable direction of the charging beam for the wireless device 110, wherein adjusting the charging beam includes directing the charging beam to the favorable direction.

The feedback provided by the wireless device 110 to the base station 100 may comprise information that allows the base station 100 to derive the favorable configuration. In one variant, the feedback may include information on charging power received by the wireless device 110 through the charging beam. For example, the information on the charging power may include at least one of one or more charging power value was observed (e.g., in real-time) during the sweeping of the charging beam, and a maximum charging power value observed during the sweeping of the charging beam including information indicative of a direction of the charging beam at which the maximum charging power was observed. The one or more charging power values may be provided with timestamps indicating when these values were observed. The information indicative of a direction of the charging beam at which the maximum charging power value was observed may correspond to a timestamp as well, e.g., a timestamp which indicates at which time the maximum charging power value was observed. In this way, the base station 100 may derive which beam direction resulted in the maximum value.

Alternatively or additionally, the feedback may include information indicative of a preferred direction of the charging beam, as identified by the wireless device 110 itself. In an example, the information indicative of the preferred direction may include a PMI enabling the base station 100 to derive which precoding matrix resulted in the most favorable charging values. The PMI may thus indicate preferred precoding weights to be applied by the base station 100 when adjusting the charging beam. In another example, the information indicative of the preferred direction may simply include a timestamp at which the wireless device 110 considers the charging values to be most favorable.

The feedback may be provided by the wireless device 110 periodically or at preconfigured events during the sweeping of the charging beam. In addition to the feedback from the wireless device 110, the identification of the favorable configuration of the charging beam may be supported by positioning techniques that allow the base station 100 to determine the precise or approximated position of the wireless device 110. These techniques may include network-based positioning techniques, such as ECID, OTDOA, and/or UTDOA, for example. In another variant, the information on the position of the wireless device 110 may be identified by the wireless device 110 itself, e.g., using a GNSS, such as GPS, and may be provided to the base station 100 by the wireless device 110.

To fine-tune the scan procedure and refine the favorable configuration of the charging beam, the sweeping of the charging beam may be carried out iteratively in different directions and/or with different offsets. Also, a favorable charging beam (e.g., its configuration) may be identified among a plurality of charging beams transmitted by the base station 100. The base station 100 may in this case sweep a plurality of charging beams in step S206, and receive, from the wireless device 110, feedback on charging qualities associated with the plurality of charging beams observed by the wireless device 110 during the sweeping of the plurality of charging beams in step S208. The feedback may include, for each of the plurality of charging beams, a beam identifier identifying the respective charging beam, wherein the beam identifier may be associated with the charging quality observed for the respective charging beam. The charging beam mentioned previously may in this case correspond to one of the plurality of charging beams and each feedback provided for the plurality of charging beams may correspond to the type of feedback described above for the (single) charging beam.

Once identified, the favorable configuration of the charging beam may be stored in a database (e.g., by the base station 100 or another network node in the wireless communication system, such as an MME), possibly associated with an ID or context of the wireless device 110, so that the base station 100 can reuse this information at a later point of time. At this point, the scan procedure may be completed and a charging module 214 of the base station 100 may charge, in step S214, the wireless device 110 by transmitting, to the wireless device 110, the adjusted charging beam.

If the wireless device 110 is a movable device, such as a drone or a drivable robot, for example, the wireless charging efficiency may also be improved by instructing the wireless device 110 to move to a location that allows for better charging conditions, or to move along a path that allows for better charging conditions while the wireless device 110 is in motion. For example, the wireless device 110 may be instructed to move out of a shadowing situation. For this purpose, the directing procedure may be performed, which corresponds to the right outgoing arrow from step S204. In the example illustrated in FIG. 2b, the directing procedure (beginning at step S216) is depicted as a procedure which may be performed as an alternative to the scan procedure (beginning at step S206). It will be understood, however, that, in other scenarios, the directing procedure may be performed in addition to the scan procedure, i.e., prior to, simultaneously with, or subsequent to the scan procedure, for example.

When the directing procedure is performed, the method proceeds with step S216, in which a movement instructions sending module 216 of the base station 100 may send, to the wireless device 110, one or more movement instructions. In step S218, a second feedback reception module 218 of the base station 100 may receive, from the wireless device 110, feedback on charging quality observed by the wireless device 110 during movement in accordance with the one or more movement instructions. Further, in step S220, a favorable location and path identification module 220 of the base station 100 may identify, based on the feedback received from the wireless device 110 during the movement, one or more preferred locations and/or one or more preferred movement paths at which favorable wireless charging conditions are present.

The one or more movement instructions may include at least one of an instruction to move to a particular direction, an instruction to orient in a particular direction, an instruction to move for a particular distance, an instruction to move to a particular location, and an instruction to move along a particular movement path. The feedback provided by the wireless device 110 to the base station 100 during the directing procedure may be of the same type as described above for the feedback provided by the wireless device 110 during the scan procedure. During movement, the wireless device 110 may also provide information to the base station 100 about the movement itself, such as an indication of the direction in which the wireless device 110 is heading or the final destination, for example.

The one or more preferred locations and/or the one or more preferred movement paths may be stored in a database (e.g., by the base station 100 or another network node in the wireless communication system, such as an MME), possibly associated with an ID or context of the wireless device 110, and may be used at a later point of time to provide movement instructions directing the wireless device 110 to these locations and/or along these movement paths again. A directing module 222 of the base station 100 may thus send, in step S222, to the wireless device 110, one or more movement instructions to direct the wireless device 110 to a preferred location and/or along a preferred movement path at which favorable wireless conditions are (known to be) present. At this point, the directing procedure may be completed and the charging module 214 of the base station 100 may thus charge, in step S214, the wireless device 110 by transmitting, to the wireless device 110, the charging beam.

The stored information on a preferred location and/or a preferred movement path may also be used for other wireless devices. In such an implementation, the preferred location and/or the preferred movement path may be identified based on feedback on charging quality received from one or more wireless devices other than the wireless device 110, i.e., in other words, the preferred location and/or the preferred movement path may have been identified in previous directing procedures performed with other wireless devices. Alternatively or additionally, a preconfigured charging location may be associated with the wireless device 110 and the wireless 110 may be instructed to move to the preconfigured charging location when a recharging need exists.

As described above, the charging of the wireless device may be carried out in step S214 once the scan procedure and/or the directing procedure is completed. Also, the wireless device 110 may already be charged using the charging power received through the charging beam during the scan procedure and/or the directing procedure. The latter may be optional, however, and effective charging may only commence after the respective procedure is completed.

In the example shown in FIG. 2b, the charging of the wireless device 110 is initiated upon request of the wireless device 110, i.e., upon the charge request received in step S204. It will be understood, however, that such initiation by the wireless device 110 is just exemplary. In another implementation, the charging of the wireless device 110 may be initiated by the base station 100 when the wireless device 110 is at a preferred location and/or a preferred movement path and, optionally, when the wireless device 110 is in an idle state. For example, the base station 100 may create a list (or map) of chargeable wireless devices in its coverage area (as well as their recharging needs, for example) and may proactively initiate the charging of the wireless device 110 when the wireless device 110 is at the preferred location and/or the preferred movement path and/or when the wireless device is in an idle state, in particular when the high-frequency communication mode of the wireless device 110 is idle.

Also, it will be understood that, in the example shown in FIG. 2b, upon receiving the recharge request in step S204, the base station 100 may optionally acknowledge the request prior to commencing the scan procedure and/or the directing procedure. When a previously determined favorable configuration of the charging beam is stored for the wireless device 110, as described above, the scan procedure may be omitted and the wireless device 110 may be charged straight away using the stored favorable configuration. In another variant, the base station 100 may acknowledge the charge request and commence the scan procedure and/or the directing procedure and/or the charging according to step S214 at a later time when high-frequency beams are not needed for communication with the wireless device 110.

The charging beam itself may be a dedicated charging beam or an idle beam currently not being used for communication, or the charging beam may result from one or more beamformed communication signals transmitted to the wireless device 110, e.g., from communication signals that are transmitted to the wireless device 110 anyway, such as synchronization signals (e.g., PSSs and SSSs) cell reference signals (e.g., CRSs), broadcast signals transmitting SI, or the like. The charging beam may be transmitted with a certain output power through one or more antennas of the base station 100, as described above.

As a further procedure for improving the wireless charging efficiency, i.e., in addition to the scan procedure and/or the directing procedure, the base station 100 may adjust parameters of the wireless device 110 to enhance reception of the charging beam. In one such variant, the base station may send, to the wireless device 110, an instruction to adjust a DRX cycle of the wireless device 110 based on the feedback received from the wireless device 110 (i.e., as received during the scan procedure and/or during the directing procedure).

In order to ensure that the base station indeed charges the wireless device 110, i.e., the device it is communicating with using communication signals, a confirmation procedure may be performed. According to this procedure, the base station 100 may temporarily direct the charging beam away from the favorable direction (this may cause the wireless device 110 to transmit an "energy reception lost" signal, or, if an "energy reception" signal is periodically sent to the base station 100 during energy reception, the wireless device 110 may cease transmitting the "energy reception" signal, or no activity from the wireless device 110 may be visible to the base station 100 at all) and redirect the charging beam back to the favorable direction, possibly approaching from a different angle (this may cause the wireless device to transmit the "energy reception" signal again) to confirm that the base station 100 charges the correct wireless device 110, i.e., the wireless device 110 the base station 100 is communicating with.

As regards signaling messages exchanged between the wireless device 110 and the base station 100 in relation to the charging of the wireless device 110, such as the above-mentioned charge request, the registration message, or the feedback, for example, dedicated communication protocols may be employed. In one variant, on the other hand, signaling related to the charging of the wireless device 110 may be carried out in accordance with an existing radio technology standard, wherein information related to the charging of the wireless device may be included in signaling messages of the existing radio technology standard. The existing radio technology standard may be one of an NB-IoT, an eMTC, an LTE, and a NR standard. It will be understood, however, that other existing radio technology standards may be employed, such as WiFi, LoRaWAN or Sigfox, for example, just to name a few.

As an example, in a connected/active state of the wireless device (e.g., RRC_CONNECTED), the information related to the charging of the wireless device 110 could be included in RRC signaling (e.g., in an RRC Release command) or in RLC signaling (e.g., in an RLC ACK or RLC status report). As another example, for dynamic scheduling, a new DCI could be used in a PDCCH to indicate, in addition to the starting point, the endpoint of the charging transmission, to indicate whether the transmission is a charging transmission, and to indicate a resource allocation for the charging transmission. As a further example, the base station may inform the wireless device about configurations of any, possibly periodic, charging transmissions in the same cell using RRC signaling.

In an idle/inactive mode (e.g., RRC_IDLE), on the other hand, the information related to the charging of the wireless device 110, such as information related to a charging configuration, for example, may be broadcasted in SI, for example. As another example, the charging configuration could be transmitted as part of a TAU performed in combination with an MME. For example, the wireless device 110 may request the wireless charging in a TAU Request message and the MME may provide the charging configuration in a TAU Accept message. When the wireless device 110 enters the idle/inactive mode, it may be necessary to keep the context of the wireless device in order to be able to continue transmitting charging signals to the wireless device 110. Corresponding information could be stored in the base station or another network node in the wireless communication system, such as the MME, for example.

If the wireless device 110 has almost no battery left, it may use a very low overhead approach to signal its recharge need. As an example, an indication of the recharge need may be transmitted by the wireless device 110 using a single bit in a random access procedure or, in another example, this indication may be made using a specific preamble (or using a specific subset of existing preambles). The preamble may also indicate the identity of the wireless device 110 and therefore allow the base station 100 to directly use a previously stored favorable configuration of the charging beam for the charging of the wireless device 110.

It will be understood that the above-described signaling options are merely exemplary and that various other implementations are conceivable. In general, the charging configuration that may be signaled to the wireless device 110 may be determined by the base station 100 based on at least one of a DRX cycle of the wireless device 110, and eDRX cycle and a PTW length, the feedback provided by the wireless device 110 in the scan procedure and/or the directing procedure, the position of the wireless device 110, SI configuration, synchronization signal configuration, a traffic pattern or subscription type (e.g., frequency of data reporting or downlink reachability) of the wireless device 110, a battery capacity of the wireless device 110, whether the wireless device 110 is battery operated or capacitor based, a coverage level of the wireless device 110, and whether the wireless device 110 is stationary or mobile. The charging configuration may specifically apply to the wireless device 110 or at least part of the charging configuration may be the same for a plurality of wireless devices in a cell, even though signaling to the wireless devices in the cell may be device specific.

Figure 3A:
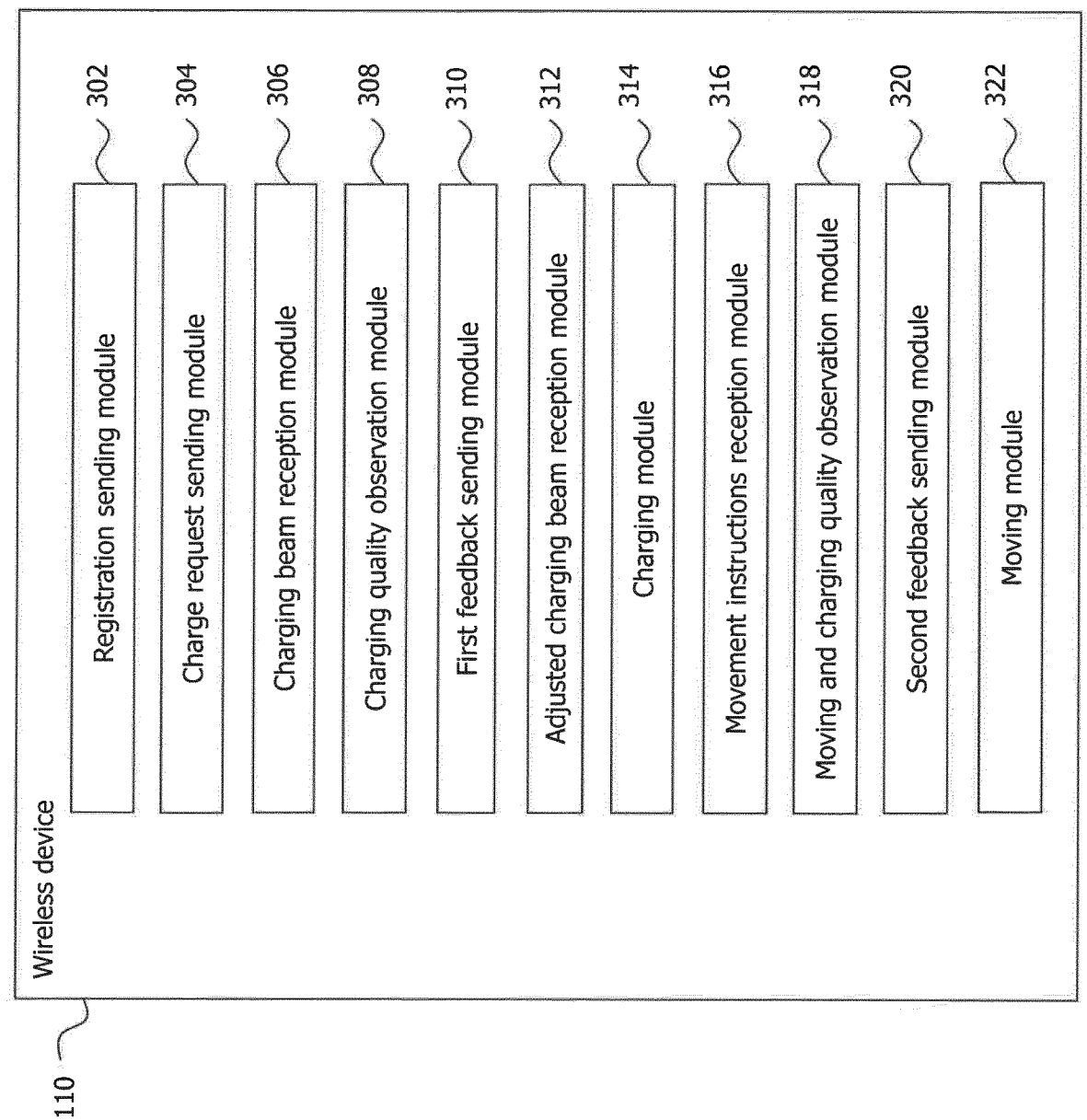
FIGS. 3a and 3b illustrate a module based design of a wireless device according to an embodiment of the present disclosure and a corresponding method embodiment which may be performed by the wireless device.
Figure 3B:
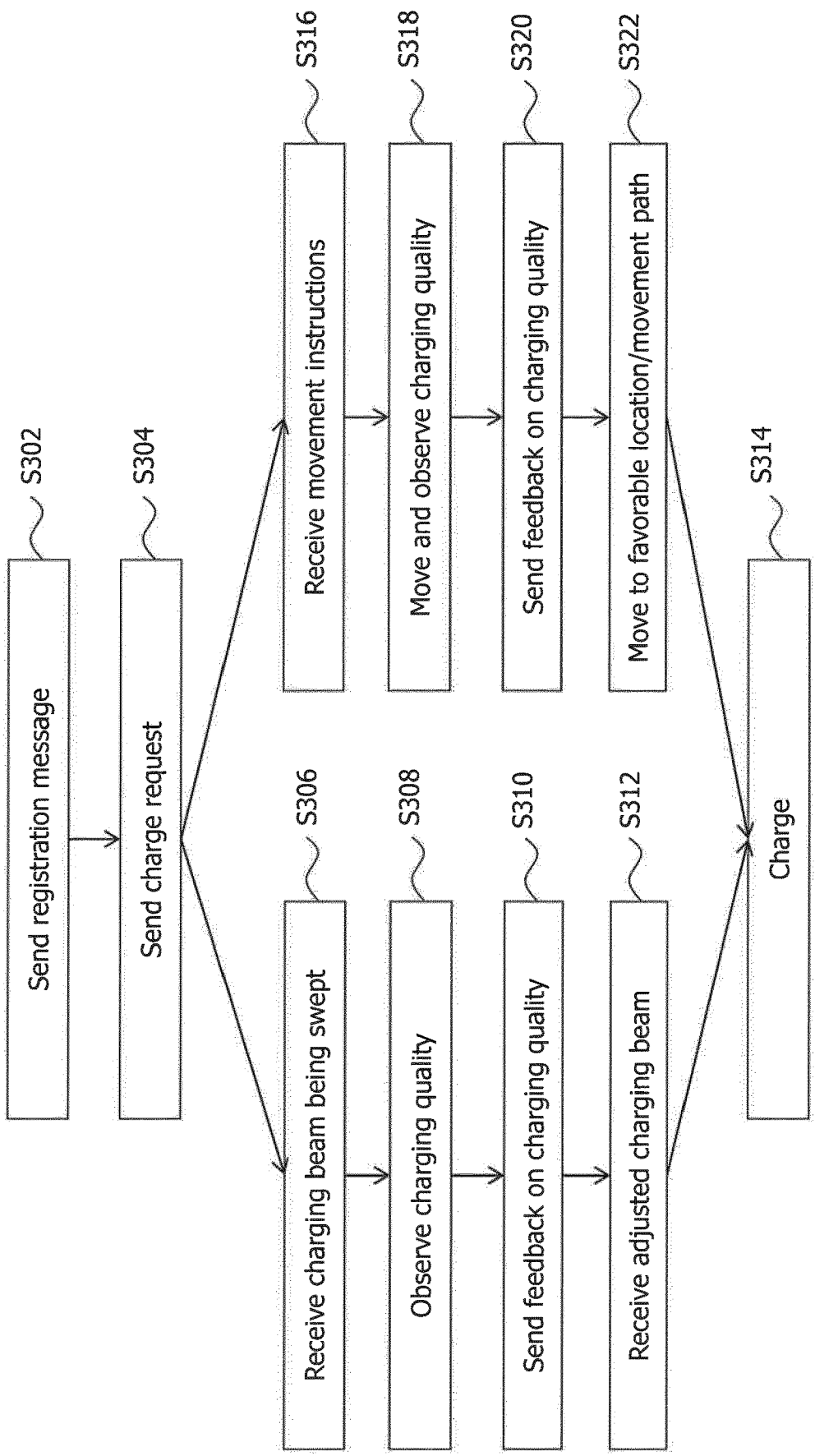

FIG. 3a schematically illustrates an exemplary module based design of the wireless device 110 and FIG. 3b illustrates a corresponding method embodiment which may be performed by the wireless device 110. Each module shown in FIG. 3a may correspond to a component that is realized in hardware and/or software. In particular, the functionality of each module may be implemented by the at least one processor 112 and the at least one memory 114 of the wireless device 110 described above in relation to FIG. 1b. The basic operation of the wireless device 110 will be described in the following with reference to both FIGS. 3a and 3b. This operation may be complementary to the operation of the base station 100 described above in relation to FIGS. 2a and 2b and, as such, aspects described above with regard to the operation of the wireless device 110 may be applicable to the operation of the wireless device 110 described in the following as well. Unnecessary repetitions are thus omitted.

Initially, in step S302, a registration sending module 302 of the wireless device 110 may send a registration message to the base station 100 to register the wireless device 110 as a rechargeable device with the wireless communication system (e.g., with the base station 100 or another network node in the wireless communication system, such as an MME). Upon completing the registration procedure, a charge request sending module 304 of the wireless device 110 may send, in step S304, a charge request to the base station 100. The method may then proceed with performing either a scan procedure (corresponding to the left outgoing arrow from step S304) or a directing procedure (corresponding to the right outgoing arrow from step S304).

When the scan procedure is performed, the method proceeds with step S306, in which a charging beam reception module 306 of the wireless device 110 may receive, from the base station 100, a charging beam being swept. Further, in step S308, a charging quality observation module 308 of the wireless device 110 may observe a charging quality during the sweeping of the charging beam and, in step S310, a first feedback sending module 310 of the wireless device 110 may send, to the base station 100, feedback on the observed charging quality.

The charging beam may be received iteratively from different directions and/or with different offsets. For the identification of a favorable charging beam among a plurality of charging beams transmitted by the base station 100, the wireless device 110 may receive, from the base station 100, a plurality of charging beams being swept in step S306, observe charging qualities associated with the plurality of charging beams during the sweeping of the plurality of charging beams in step S308, and send, to the base station 100, feedback on the observed charging qualities in step S310. The feedback may include, for each of the plurality of charging beams, a beam identifier identifying the respective charging beam, wherein the beam identifier is associated with the charging quality observed for the respective charging beam.

When the charging beam is adjusted in response to sending the feedback to the base station 100 in step S310, an adjusted charging beam reception module 312 may receive, from the base station 100, the adjusted charging beam, and a charging module 314 of the wireless device 110 may charge, in step S314, the battery 116 of the wireless device 110 using the adjusted charging beam received from the base station 100.

If the wireless device 110 is a movable device, the directing procedure may be performed, which corresponds to the right outgoing arrow from step S304. Similar to FIG. 2b, in the example of FIG. 3b, the directing procedure (beginning at step S316) is depicted as a procedure which may be performed as an alternative to the scan procedure (beginning at step S306). It will be understood, however, that, in other scenarios, the directing procedure may be performed in addition to the scan procedure, i.e., prior to, simultaneously with, or subsequent to the scan procedure, for example.

When the directing procedure is performed, a movement instructions reception module 316 of the wireless device 110 may receive, in step S316, from the base station 100, one or more movement instructions and a moving and charging quality observation module 318 of the wireless device 110 may move, in step S318, in accordance with the one or more movement instructions and observe a charging quality during the movement. Further, a second feedback sending module 320 of the wireless device 110 may send, in step S320, feedback on the observed charging quality to the base station 100. Once a preferred location and/or a preferred movement path is known, a moving module 322 of the wireless device 110 may receive, in step S322, one or more movement instructions from the base station 100 to move to a preferred location and/or along a preferred movement path, and control the wireless device 110 to move in accordance with the one or more movement instructions.

Once the wireless device 110 arrives at the preferred location and/or moves along the preferred movement path, the charging beam reception module 306 may receive, from the base station 100, the charging beam, and the charging module 314 may charge, in step S314, the battery 116 of the wireless device 110 using the charging beam received from the base station 100.

Similar to FIG. 2b, in the example shown in FIG. 3b, the charging of the wireless device 110 is initiated upon request of the wireless device 110, i.e., upon sending the charge request in step S304. In another implementation, the charging of the wireless device may occur without initiation by the wireless device 110 when the wireless device 110 is at a preferred location and/or a preferred movement path and, optionally, when the wireless device 110 is in an idle state. In this case, charging may be proactively initiated by the base station 100, as described above.

As a further measure for improving the wireless charging efficiency, the wireless device 110 may receive, from the base station 100, an instruction to adjust a DRX cycle of the wireless device 110 in response to sending the feedback to the base station 100 in either one of the steps S310 and S320.

Figure 4:
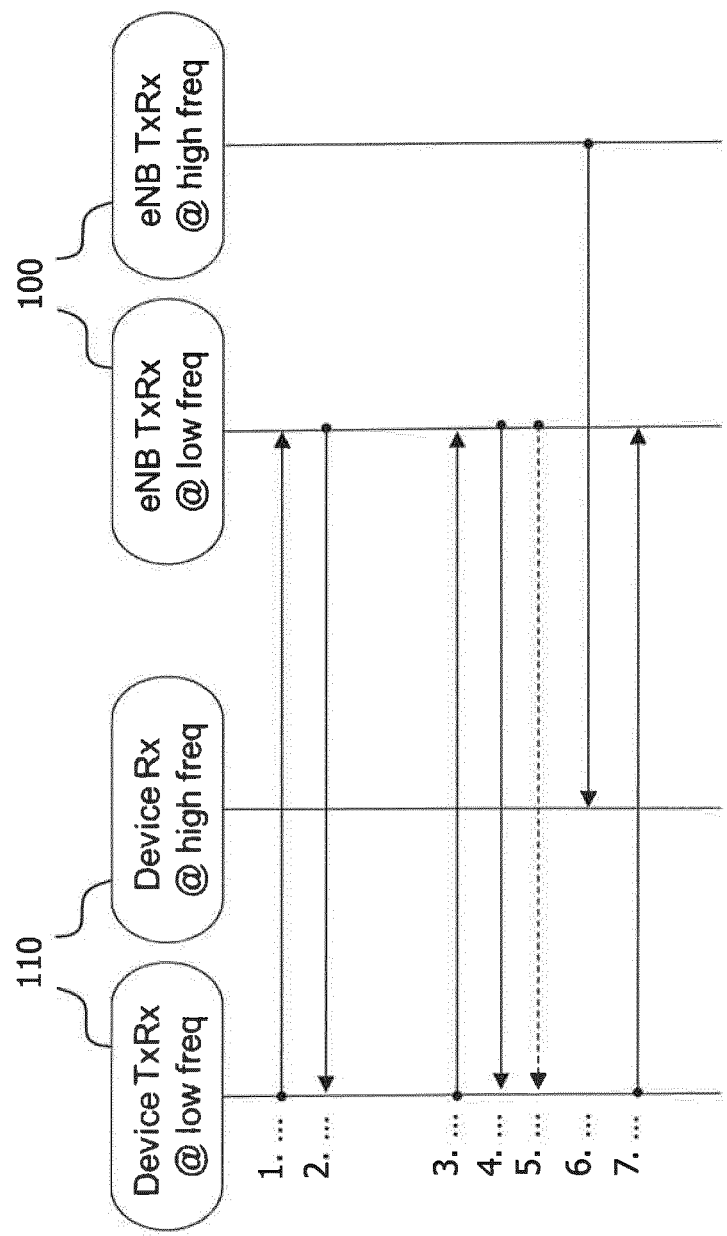
FIG. 4 illustrates an exemplary signaling procedure performed by a wireless device and a base station to initiate a scan procedure according to the present disclosure.

FIG. 4 illustrates an exemplary signaling procedure performed by the wireless device 110 and the base station 100 to initiate a scan procedure. In the example of FIG. 4, both the wireless device 110 and the base station 100 can transmit (Tx) and receive (Rx) at low frequency and at high frequency. For ease of understanding, both the wireless device 110 and the base station 100 are depicted as entities having a low frequency part and a high frequency part. It will be understood that—although depicted separately—the respective low and high frequency parts belong to the same entity, i.e., the wireless device 110 and the base station 100, respectively. The base station 100 is denoted as an "eNB" and may thus belong to an LTE network, for example.

In step 1 of the signaling procedure, the wireless device 110 sends a registration message to the base station 100 in line with steps S202 and S302 described above. In step 2, the base station 100 sends an acknowledgment to the wireless device 110 and, in step 3, the wireless device 110 initiates the scan procedure by sending a charge request to the base station 100 in line with steps S204 and S304 described above. In step 4, the base station 100 again responds with an acknowledgment which may indicate that the charging will be done. In step 5, a message is sent from the base station 100 to indicate to the wireless device 110 that the scan procedure now commences. It will be understood that the message of step 5 is merely optional and that the conveyed information could also be included in the message of step 4. All communication being exchanged in steps 1 to 5 is carried out using the low frequency parts of the wireless device 110 and the base station 100. In step 6, the base station 100 starts performing the scan procedure by transmitting one or more charging beams and slowly sweeping the one or more charging beams in line with steps S206 and S306 described above. In the shown example, transmission of the one or more charging beams is carried out using the high frequency parts of the base station 100 and the wireless device 110. Finally, in step 7, the wireless device 110 sends an "energy reception" signal, again at low frequency, to indicate to the base station 100 that energy is received. From that point on, the scan procedure may be continued as described above in relation to FIGS. 2b and 3b. In this signaling procedure, all signaling messages (i.e., all actual communication messages) are transmitted at low frequency using the low frequency parts of the wireless device 110 and the base station 100, whereas transmission of the actual charging beam is carried out at high frequency using the high frequency parts of the wireless device 110 at the base station 100. This may be advantageous because, at higher frequencies, sharper beamforming may be possible, which may result in more efficient wireless charging.

Figure 5B:
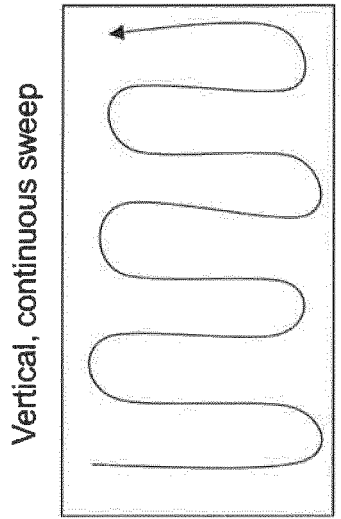
FIGS. 5a and 5b illustrate exemplary beam sweeping procedures which may be performed by a base station according to the present disclosure.
Figure 5A:
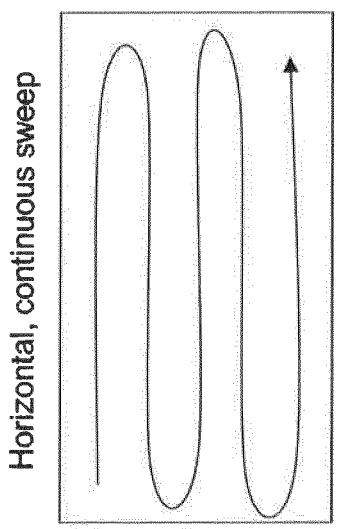

FIGS. 5a and 5b illustrate exemplary beam sweeping procedures which may be performed by the base station 100. FIG. 5a exemplarily illustrates a case in which the charging beam is swept slowly over the surface in a horizontal direction. More specifically, the direction of the charging beam is continuously swept in the horizontal direction in a meandering (i.e., serpentine-like) form with small offsets in the vertical direction. FIG. 5b illustrates a similar example in which, instead of the horizontal direction, the charging beam is swept in the vertical direction with offsets in the horizontal direction. As described above, the sweeping of the charging beam may be carried out iteratively in different directions and/or with different offsets in order to fine-tune the scan procedure and refine the favorable configuration of the charging beam.

Figure 6:
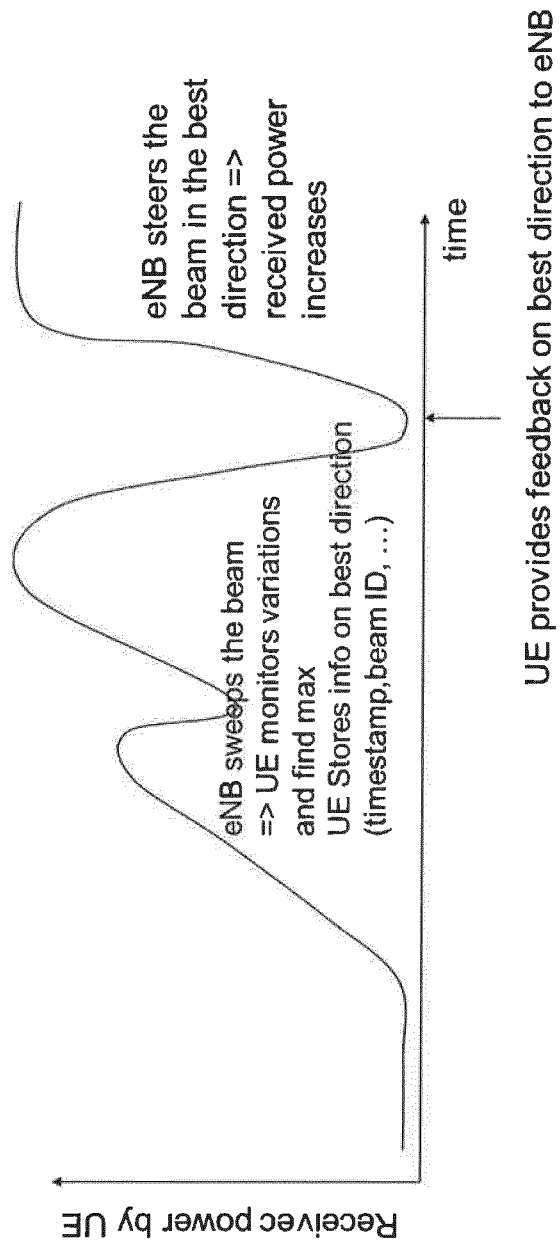
FIG. 6 illustrates variations in charging power received by a wireless device during an exemplary scan procedure according to the present disclosure.

FIG. 6 illustrates the power received by the wireless device 110 during an exemplary scan procedure performed by the base station 100. In the shown example, the wireless device 110 is indicated as a UE and the base station 100 is indicated as an eNB. As shown, the wireless device 110 observes variations in the charging power received through the charging beam over time, i.e., when the charging beam is being swept by the base station 100. Among the observed variations in the received charging power, the wireless device 110 may identify the most favorable charging beam direction and store corresponding information, such as the timestamp at which the maximum charging power was observed as well as the corresponding beam ID, for example. The wireless device 110 may then provide the stored information as feedback to the base station 100 and, in turn, the base station 100 may adjust the charging beam by steering the charging beam in the most favorable direction so that the wireless charging efficiency is maximized.

Figure 7:
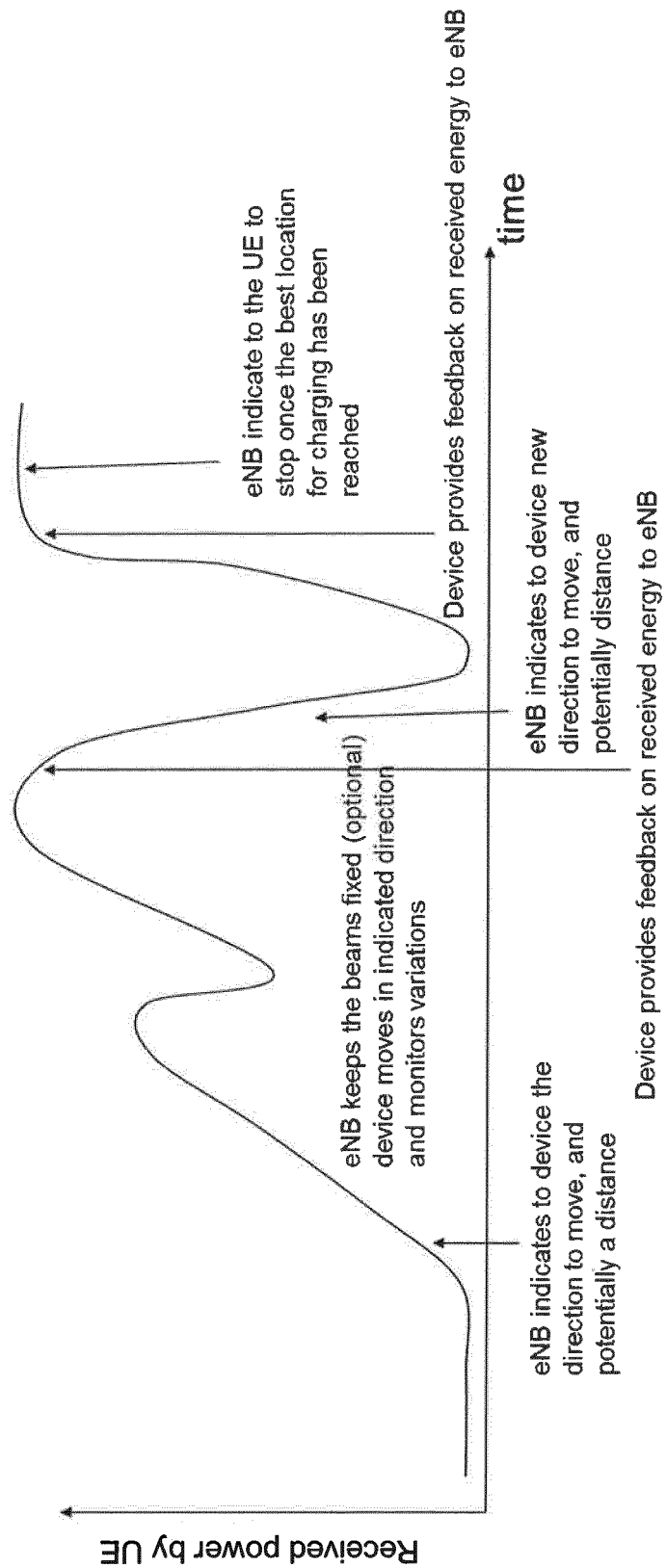
FIG. 7 illustrates variations in charging power received by a wireless device during an exemplary directing procedure according to the present disclosure.

FIG. 7 similarly illustrates the power received by the wireless device 110 during an exemplary directing procedure performed by the base station 100. As shown, the base station 100 instructs the wireless device 110 to start moving in a given direction and, optionally, for a given distance. The wireless device 110 starts moving accordingly and observes variations in the charging power received through the charging beam transmitted by the base station 100, and provides feedback on the received energy to the base station 100. During the movement of the wireless device 110, the base station 100 may keep the charging beam fixed. However, this is not mandatory and it will be understood that, during the movement of the wireless device 110, the base station 100 may simultaneously sweep the charging beam. Movement instructions may be provided to the wireless device 110 iteratively, so that at a certain point, the base station 100 may instruct the wireless device 110 to move in another direction and, again, for a given distance, in an attempt to identify locations that allow better charging conditions. The wireless device 110 again provides feedback on charging quality when moving in accordance with the new movement instructions and, finally, at a certain point, the base station 100 instructs the wireless device 110 to stop, e.g., when the wireless device 110 has arrived at a most favorable charging location.

As has become apparent from the above, the present disclosure provides a technique for wirelessly charging a wireless device using a charging beam transmitted by a base station in a wireless communication system. By performing a scan procedure that allows the base station to adjust the charging beam based on feedback on charging quality from the wireless device and/or by performing a directing procedure that allows moving the wireless device to a preferred location and/or along a preferred movement path at which favorable charging conditions are present, the wireless charging efficiency may be improved for the wireless device. Since the wireless device may thus be charged over long distances while in use, even when in motion, a reduced need for energy storage capacity may be the result. According to the presented technique, the wireless charging efficiency may also be improved by further measures, such as adjusting the DRX cycle of the wireless device in order to enhance reception of the charging beam by the wireless device. Further, the technique presented herein proposes effective signaling procedures that may be carried out in accordance with existing radio technology standards, such as an NB-IoT, an eMTC, an LTE, and a NR standard, to realize the behavior of the entities involved in the procedures.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for wirelessly charging a wireless device using a charging beam transmitted by a base station in a wireless communication system, the method being performed by the base station and comprising:
   sending, to the wireless device, one or more movement instructions;
   receiving, from the wireless device, feedback on charging quality observed by the wireless device during movement in accordance with the one or more movement instructions; and
   identifying, based on the feedback received from the wireless device during the movement, one or more preferred locations and/or one or more preferred movement paths at which preferred wireless charging conditions are present.

2. The method of claim 1, further comprising:
   receiving, from the wireless device, feedback on charging quality observed by the wireless device; and
   adjusting the charging beam based on the feedback received from the wireless device.

3. The method of claim 2:
   further comprising sweeping the charging beam;
   wherein the feedback is received from the wireless device during the sweeping of the charging beam.

4. The method of claim 3, wherein the sweeping of the charging beam is carried out iteratively in different directions and/or with different offsets.

5. The method of claim 2, further comprising:
   identifying, based on the feedback received from the wireless device, a preferred direction of the charging beam for the wireless device, wherein adjusting the charging beam includes directing the charging beam to the preferred direction.

6. The method of claim 2, wherein the feedback includes:
   information on charging power received by the wireless device through the charging beam; and/or
   information indicative of a preferred direction of the charging beam.

7. The method of claim 2, further comprising:
   sweeping a plurality of charging beams; and receiving, from the wireless device, feedback on charging qualities associated with the plurality of charging beams observed by the wireless device during the sweeping of the plurality of charging beams; and wherein the feedback includes, for each of the plurality of charging beams, a beam identifier identifying the respective charging beam, the beam identifier being associated with the charging quality observed for the respective charging beam.

8. The method of claim 1, further comprising:

sending, to the wireless device, one or more movement instructions to direct the wireless device to a preferred location and/or along a preferred movement path at which preferred wireless charging conditions are present;

wherein the preferred location and/or the preferred movement path is identified based on feedback on charging quality received from one or more wireless devices other than the wireless device.

9. The method of claim 1, wherein the charging of the wireless device is initiated by the base station when the wireless device is at a preferred location and/or a preferred movement path.

10. The method of claim 1, further comprising:

sending, to the wireless device, an instruction to adjust a discontinuous reception cycle of the wireless device based on the feedback received from the wireless device.

11. The method of claim 1, further comprising:

temporarily directing the charging beam away from a preferred direction and redirecting the charging beam back to the preferred direction to confirm that the base station charges the correct wireless device.

12. The method of claim 1, further comprising:

receiving, prior to receiving the feedback, a registration message from the wireless device to register the wireless device as a rechargeable device with the wireless communication system.

13. A method for wirelessly charging a wireless device using a charging beam transmitted by a base station in a wireless communication system, the method being performed by the wireless device and comprising:

receiving, from the base station, one or more movement instructions;

moving in accordance with the one or more movement instructions;

observing a charging quality during the movement; and sending, to the base station, feedback on the observed charging quality.

14. The method of claim 13, further comprising:

receiving, from the base station, a charging beam;

observing a charging quality; and sending, to the base station, feedback on the observed charging quality.

15. The method of claim 14, wherein the charging beam is received iteratively from different directions and/or with different offsets.

16. The method of claim 14, further comprising receiving, from the base station, an instruction to adjust a discontinuous reception cycle of the wireless device in response to sending the feedback to the base station.

17. The method of claim 13:

wherein the charging beam is being swept, and wherein the charging quality is observed during the sweeping of the charging beam.

18. The method of claim 13, wherein the feedback includes:

information on charging power received by the wireless device through the charging beam; and/or information indicative of a preferred direction of the charging beam.

19. The method of claim 13, further comprising:

receiving, from the base station, a plurality of charging beams being swept;

observing charging qualities associated with the plurality of charging beams during the sweeping of the plurality of charging beams; and sending, to the base station, feedback on the observed charging qualities; and wherein the feedback includes, for each of the plurality of charging beams, a beam identifier identifying the respective charging beam, the beam identifier being associated with the charging quality observed for the respective charging beam.

20. The method of claim 13, further comprising:

receiving, from the base station, one or more movement instructions to move to a preferred location and/or along a preferred movement path; and moving in accordance with the one or more movement instructions.

21. The method of claim 13, wherein charging of the wireless device occurs without initiation by the wireless device when the wireless device is at a preferred location and/or a preferred movement path.

22. The method of claim 13, further comprising sending a registration message to the wireless communication system to register the wireless device as a rechargeable device with the wireless communication system.

23. A base station for wirelessly charging a wireless device using a charging beam transmittable in a wireless communication system by the base station, the base station comprising;

processing circuitry;

memory containing instructions executable by the processing circuitry whereby the base stations is operative to:

send, to the wireless device, one or more movement instructions;

receive, from the wireless device, feedback on charging quality observed by the wireless device during movement in accordance with the one or more movement instructions; and identify, based on the feedback received from the wireless device during the movement, one or more preferred locations and/or one or more preferred movement paths at which preferred wireless charging conditions are present.

24. A wireless device configured to be wirelessly charged using a charging beam transmittable by a base station in a wireless communication system, the wireless device comprising:

processing circuitry;

memory containing instructions executable by the processing circuitry whereby the wireless device is operative to:

receive, from the base station, one or more movement instructions;

move in accordance with the one or more movement instructions;

observe a charging quality during the movement; and send, to the base station, feedback on the observed charging quality.

* * * * *